United States Patent
Silverman

(10) Patent No.: US 7,620,589 B2
(45) Date of Patent: Nov. 17, 2009

(12) United States Patent

(54) WIN, LOSE OR DRAW FIXED-PAYOFF DERIVATIVE

(76) Inventor: Bruce David Silverman, 1117 Marquette Ave., Apt. 1903, Minneapolis, MN (US) 55403

( * ) Notice: Subject to any disclaimer, the term of this patent is extended or adjusted under 35 U.S.C. 154(b) by 434 days.

(21) Appl. No.: 11/484,223

(22) Filed: Jul. 11, 2006

(65) Prior Publication Data

US 2007/0011072 A1    Jan. 11, 2007

Related U.S. Application Data

(60) Provisional application No. 60/698,122, filed on Jul. 11, 2005.

(51) Int. Cl.
*G06Q 40/00* (2006.01)
*A63F 9/24* (2006.01)
(52) U.S. Cl. ............... 705/37; 705/35; 463/25
(58) Field of Classification Search ............ 705/37; 463/25
See application file for complete search history.

(56) References Cited

U.S. PATENT DOCUMENTS 7,389,262 B1 * 6/2008 Lange ................. 705/37
2006/0143099 A1 * 6/2006 Partlow et al. ......... 705/35

OTHER PUBLICATIONS

Pelsser, Antoon, "Pricing double barrier options using Laplace transforms," Finance and Stochastics, Jan. 2000, vol. 4, No. 1, pp. 95-104.*

* cited by examiner

*Primary Examiner*—Charles R Kyle
*Assistant Examiner*—David L Wood

(57) ABSTRACT

A fixed-payoff derivative that provides the opportunity to speculate on the movement of single-stock equities, equity indexes, bonds, commodities and currencies in a manner that eliminates the cost of an option premium. The invention, henceforth referred to as a "Win, Lose or Draw" derivative contract, is a cash position for or against the occurrence of a designated price event above an underlying financial instrument's spot price before a designated price event below an underlying financial instrument's spot price, or vice versa, within a designated time period. If neither designated price event occurs within the designated time period, no loss of cash position is incurred by either party.

19 Claims, 1 Drawing Sheet

WIN, LOSE OR DRAW FIXED-PAYOFF DERIVATIVE

RELATED APPLICATIONS

This application claims priority to U.S. Provisional Patent Application No. 60/698,122, entitled "Premium-Free Place Option Derivative" filed Jul. 11, 2005, which is hereby incorporated by reference.

FIELD OF THE INVENTION

This application relates generally to derivative securities traded in a securities market; more particularly to a new form of securities derivative traded on a securities exchange or other suitable market; and more particularly still to a derivative product that provides win, lose or draw scenarios that involve fixed cash positions and fixed payoffs based on the price movements of an underlying financial instrument within a designated time frame.

BACKGROUND OF THE INVENTION

The use of non-linear derivatives has become a widespread instrument and vital tool in the financial markets over the last thirty years, ever since the Black-Scholes formula for calculating the price of options was introduced in 1973. As with all non-linear derivatives created since that time, one of the fundamental aspects to trading such financial instruments is the pricing of the option, or what is known as the "premium." Many variations of the Black-Scholes formula have been proposed and implemented, particularly formula variations that take into account the aspects of American-style options. Furthermore, many variations of options derivatives have been devised, including exotic options of varying characteristics and parameters. Regardless of the parameters of these non-linear derivatives, they are typically subject to a premium that is tied to the underlying financial instrument, be that underlying instrument a stock issue, stock index, currency instrument or futures instrument. Indeed, there are even non-linear derivatives on linear derivatives in the form of options on futures.

Despite the fact that non-linear derivatives are largely designed as a hedging instrument for mitigating risk, the potential for sizable losses still exists if a non-linear derivative such as so-called "plain vanilla option" expires "out of the money" and the entire cost of the premiums lost, or even when such an option expires "in the money" but the final value of the option is less than the original premium paid. In other words, if expectations for the performance of an underlying instrument within a designated time frame do not meet a minimum criteria, at least some portion of the cost of the option premium will be lost. Still, one of the reasons non-linear derivatives, specifically options, offer so much appeal is because one will always know exactly the maximum amount of downside risk before taking a position—the cost of the premium—while the potential upside is theoretically limitless.

However the theoretically limitless gains that can be realized in an options position usually has a topside implied by the volatility of the underlying instrument. Furthermore, because the cost of a premium is always at risk of losing value, traders have devised elaborate hedging strategies such as "delta hedging" to mitigate the risk of lost value. In other words, they are hedging against hedging strategies, creating financial maneuvers that can become very intricate, confusing and speculatively hazardous. These shortcomings of non-linear derivatives highlight the need for a simpler and safer hedging, leveraging and speculating strategy on the movement of underlying financial instruments.

SUMMARY OF THE INVENTION

The present invention offers a new approach to trading derivatives by introducing an instrument that eliminates the cost and risk associated with a premium. Just like existing derivatives, the new premium-free "Win, Lose or Draw" derivative contract is based on the speculative price movement of an underlying instrument within a designated period of time. But instead of offering the potential for unlimited gain along with the right (but not the obligation) to purchase the underlying instrument at a specified price in exchange for a premium, the premium-free Win, Lose or Draw derivative contract offers a predefined payoff derived indirectly from the implied volatility of the underlying instrument and dictates the exact gain or loss that would be realized for any position should one specified event occur before another specified event with respect to the underlying financial instrument at or before a designated expiration period. If neither specified event occurs, neither cash position is lost and the individuals holding the positions will only incur the cost of their trade transaction, that is, the broker's fee.

The key to understanding the distinction of the present invention is the introduction of a ratio of "implied probability" between two potential events for an underlying instrument, specifically, the implied probability of one event occurring before another event occurs within a designated time period.

A loose correlation would be to consider the so-called "place number" wagers in the game of Craps. This is a wager that a given number will occur before another given number occurs in the roll of the dice, specifically, bets for or against the occurrence of the individual number values 4, 5, 6, 8, 9 and 10 before the occurrence of the number value 7, or vice versa. If a winning event occurs, the wager is paid off according to the odds for the winning event occurring versus the losing event occurring, minus the casino's house edge. If neither a winning event or losing event occurs on any given roll of the dice, the wager is neither won nor lost.

In a Win, Lose or Draw derivative contract, two speculative prices for an underlying financial instrument—one above and one below the spot price of an underlying financial instrument—are the winning and losing events. If neither speculative price occurs before or at a designated expiry, then a position is neither won nor lost. However, unlike the game of Craps, where there are known probabilities based on 36 possible combinations for 11 possible outcomes, non-linear derivatives don't have inherent probabilities for specific events occurring. Instead, in order to calculate the payoff for a position in a Win, Lose or Draw contract, one must consider the implied volatility of the underlying instrument at any given spot price to determine the probability of the underlying instrument reaching one speculative price above the given spot price before reaching another speculative price below the given spot price or vice versa. The ratio derived from the implied volatility of an underlying financial instrument's spot price with respect to the two speculative prices—one above and one below the spot price—is the "implied probability" ratio used to determine a cash position and speculative return. The likelihood of one speculative price event occurring before the other speculative price event with regard to an underlying financial instrument's spot price at any given point in time is determined by comparing the implied volatility of the underlying instrument as reflected by a metric such as option strike price premiums, where the premium for a Call strike price above the underlying instrument's spot price is compared to the premium for a Put strike price below the underlying instrument's spot price and the comparison establishing the likelihood of one strike price—that is, one speculative price event—being realized before the other strike price—that is, the other speculative price event—within the same period of time.

It is also essential to understand that the new premium-free Win, Lose or Draw contract is a "pure" derivative that is not tied to ownership of the underlying instrument, but rather, matches a party who believes that the underlying instrument will reach a designated price above the spot price before the underlying instrument reaches a designated price below the spot price with a party who believes that the underlying instrument will reach the designated price below the spot price before the underlying instrument reaches the designated price above the spot price.

The derivative contract specific to the invention may be formed by applying the implied probability ratio on a per-share basis or as a function of standardized currency increments. If one of the speculative price events occurs before the other speculative price event within the time frame indicated by the metric used to determine the implied probability ratio, then the trade is settled in accordance with the monies set aside in escrow during the transaction period. If neither event occurs, the monies are released from escrow and returned to the parties' accounts and the only loss that is realized by either party is the cost of executing the trades.

BRIEF DESCRIPTION OF THE DRAWINGS

The present invention is more readily understood with reference to the following drawings.

DETAILED DESCRIPTION OF THE INVENTION

Figure 1:
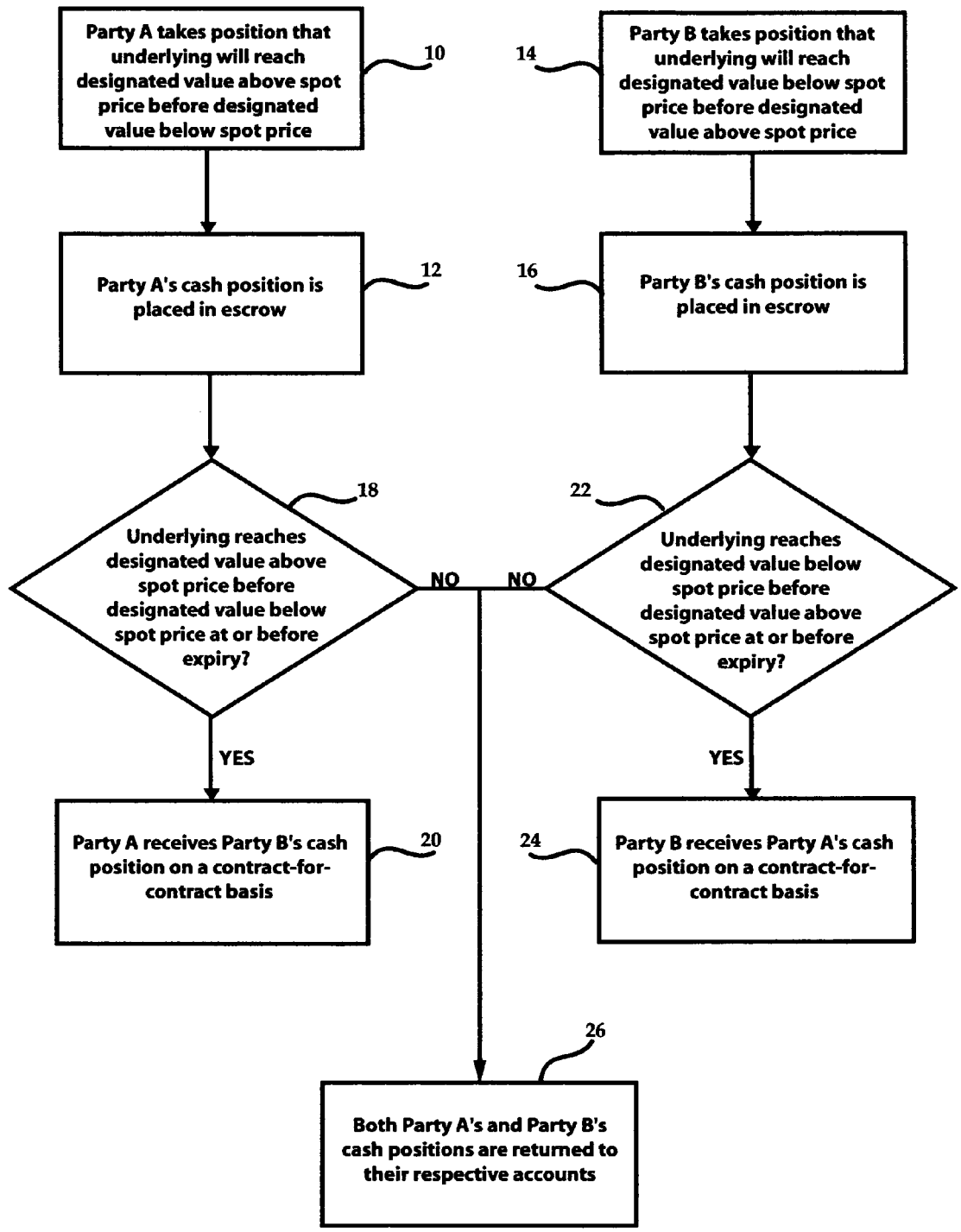
FIG. 1 is a flow chart that depicts the general sequence of events according to an embodiment of the present invention.

The present invention introduces a new type of derivative instrument, specifically, a pure derivative that does not require a position in the underlying financial instrument to which the derivative is tied, or, consequently, a premium to be paid by either party. Instead, the new, premium-free "Win, Lose or Draw" contract introduces the concept of "implied probability" for determining a reward ratio for one price event above a financial instrument's spot price occurring before a price event below the financial instrument's spot price, and vice versa, within a specified period of time. If neither speculative price event occurs within the specified period of time, neither party loses the value of their cash position.

Any application of a Win, Lose or Draw contract must be tied to a spot value for an underlying financial instrument (henceforth referred to as simply "the underlying"). The underlying may be an equity listing such as a common stock, an index listing such as the S&P 500, a commodities future such as corn or gold or any currency future. Furthermore, for any Win, Lose or Draw transaction, each of two parties must assume a cash position based on a speculative price above and below the spot price for a given underlying. The cash position can be based on any number of factors. For example, a typical options position is based on an equivalent of 100 shares per contract multiplied by the cost of the premium per share for that option. The same metric can be applied to Win, Lose or Draws for establishing a cash position. This does not preclude the use of other metrics such as establishing a standard contract equal to a fixed dollar amount, such as $100 per contract.

FIG. 1 represents the general sequence of events for one embodiment of the invention, regardless of the metric used to determine the "implied probability" ratio, which in turn is applied to determine a cash position and fixed return for either party. The general sequence of events begins at step 10, where Party A takes a position that the underlying will reach a designated value above the spot price before reaching a designated value below the spot price at or before expiry, and at step 12, Party A's cash position is deposited into an escrow account. At step 14, Party B takes the opposite position that the underlying will reach a designated value below the spot price before reaching a designated value above the spot price at or before expiry, and at step 16, Party B's cash position is deposited in an escrow account. At step 18, if the underlying reaches the designated value above the spot price before the designated value below the spot price at or before expiry, then Party A receives Party B's cash position on a contract-for-contract basis at step 20. At step 22, if the underlying reaches the designated value below the spot price before reaching the designated value above the spot price at or before expiry, then Party B receives Party A's cash position on a contract-for-contract basis at step 24. If at steps 18 and 22, the underlying reaches neither the designated values above nor below the spot price at or before expiry, then both cash positions are returned to both parties' accounts at step 26. It will be appreciated that this sequence of events does not take into account the transaction costs associated with the trade, that is, the broker's fee.

In one embodiment of the invention, the metric used to determine the implied probability ratio, cash positions and fixed payoffs can be the strike price premiums for Calls and Puts above and below the spot price for a common underlying and expiry. TABLE 1 below denotes symbols and formulas that can be used to illustrate such an embodiment.

TABLE 1

X = Spot Value of Underlying
S1 = Call Strike Price Above X
S2 = Put Strike Price Below X
P1 = S1 Premium
P2 = S2 Premium
F1 = P2 ÷ P1
F2 = P1 ÷ P2
D1 = P1 × 100 × # of contracts
D2 = P2 × 100 × # of contracts
S1 before S2 = (F1 × D1) + D1
S2 before S1 = (F2 × D2) + D2

In this application, where X denotes the underlying, the Call strike price above the spot price for the underlying, denoted by the symbol S1, has a corresponding premium denoted by the symbol P1, and the Put strike price below the spot price for the underlying, denoted by the symbol S2, has a corresponding premium denoted by the symbol P2.

Because the premiums for standard American and European options (often referred to as plain, vanilla options) reflect implied volatility for the underlying, the invention uses the values of the respective premiums (P1 and P2) specific to an underlying's spot price at any given point in time to establish an implied probability of a Call strike price above the underlying spot price occurring before a Put strike price below the underlying's spot price and vice versa before or at a common expiry. In other words, the invention compares a Call strike price premium above the underlying and a Put strike price premium below the underlying, with the same expiry, to determine the likelihood of one strike price occurring before the other strike price before or at expiry. By using a Call strike price that is "out of the money" and a Put strike price that is out of the money as two respective target prices, one creates a reasonable, speculative scenario as to which direction an underlying instrument might move from a common starting point. It is the ratio of the two strike price premiums relative to the spot price of an underlying at any given time that is used to determine the implied probability of one strike price being reached before the other strike price, and subsequently, the cash positions and potential, fixed payoff for each party that holds a position in a Win, Lose or Draw contract.

If one is taking a position that a designated Call strike price (S1) above the underlying's spot price will occur before a designated Put strike price (S2) below the underlying's spot price within the same designated time period, his cash position, represented by the symbol D1, would be the cost of the Call strike price premium (P1) multiplied by 100 multiplied by the number of contracts for his position. Conversely, if one is taking a position that a designated Put strike price (S2) below the underlying's spot price will occur before a designated Call strike price (S1) above the underlying's spot price within the same designated time period, his cash position, represented by the symbol D2, would be the cost of the Put strike price premium (P2) multiplied by 100 multiplied by the number of contracts for his position.

If the designated Call strike price should occur before the designated Put strike price for the given underlying within the designated time period, the party that holds the Call position would receive a payoff based on the implied probability of the Call strike price being reached relative to the Put strike price being reached, where the factor (F1), by which his cash position (D1) would be multiplied to determine his payoff, would be the Put strike price premium (P2) divided by the Call strike price premium (P1). That payoff would then be added to his original cash position (D1), and the sum credited to his account, less any trade transaction fees.

Conversely, if the designated Put strike price should occur before the designated Call strike price for any given underlying within the designated time period, the party that holds the Put position would receive a payoff based on the implied probability of the Put strike price being reached relative to the Call strike price being reached, where the factor (F2), by which he would multiply his cash position (D2) to determine his payoff, would be the Call strike price premium (P1) divided by the Put strike price premium (P2). That payoff would then be added to his original cash position (D2), and the sum credited to his account, less any trade transaction fees.

In other words, if the Call strike price is reached before the Put strike price, the party holding the Call position would receive the cash position for the party holding the Put position on a contract-for-contract basis. If the Put strike price is realized before the Call strike price, the party holding the Put position would receive the cash position of the party holding the Call position on a contract-for-contract basis. As stated earlier, if neither strike price is reached before or at expiry, the cash positions are returned to their respective parties' accounts, less any trade transaction fees.

It will be appreciated that in lieu of available stock options tables to create the implied probability ratios, dedicated Win, Lose or Draw probability tables with their own target prices above and below an underlying's spot price and specific time frames and experies can be formulated and applied as tools for generating the implied probability ratios needed to determine cash positions and payoffs for Win, Lose or Draw contract positions. Such formulas can be as simple as the comparison of the distance of each of two Win, Lose or Draw target price above and below an underlying's spot price, or, it can involve more intricate mathematics that take into account the history of upward volatility versus downward volatility.

The following example will help illustrate how a Win, Lose or Draw trade might transpire, using a hypothetical underlying and hypothetically available option strike prices and premiums as a metric for determining the implied probability ratio, which in turn is used to establish the cash positions and potential predetermined payoff for the two parties:

Suppose the underlying in question is the common stock for company XYZ. Company XYZ's stock price at a given point in time—the spot price—is $25 per share. At the same point in time, the June 30 Calls for XYZ have a premium of $1 per share and the June 22½ Puts have a premium of $2 per share. The implied volatility of the underlying reflected by the premiums of the two strike prices suggest that within the same time period, the underlying stock price for XYZ is twice as likely to reach $22½ per share as $30 per share. Applying the basic probability principle that the true-odds payoff for one event occurring before another event is the probability of the losing event occurring divided by the probability of the winning event occurring, then the true-odds payoff for XYZ reaching $30 per share before $22½ per share is 2:1. Conversely the true odds payoff for XYZ reaching $22½ per share before $30 per share is 1:2.

Continuing with the example, let's say that Party A assumes a one-contract Win, Lose or Draw position that the stock price for the underlying XYZ will reach $30 per share before reaching $22½ per share before or at the June expiry and Party B is willing to take the opposite position that the underlying XYZ will reach $22½ per share before reaching $30 per share before or at the June expiry. Party A's cash position, equivalent to 100 shares at a premium of $1 per share would be $100. Party B's cash position, equivalent to 100 shares at a premium of $2 per share would be $200. If the underlying reaches $30 per share before $22½ per share before or at the June expiry, Party A's payoff would be 2:1, or $200, which would be added to Party A's original $100 cash position for a total return of $300 that would be credited back to Party A's account and Party B would lose his $200 cash position. Conversely, if the underlying reaches $22½ per share before $30 per share before or at the June expiry, Party B's payoff would be 1:2, or $100, which would be added to Party B's original $200 cash position for a total return of $300 that would be credited back to Party B's account and Party A would lose his $100 cash position. If the underlying reaches neither $30 per share nor $22½ per share before or at the June expiry, Party A's original $100 cash position would be credited back to his account and Party B's original $200 cash position would be credited back to his account. It will be appreciated that cash positions and total return figures exclude any trade transaction fees.

Using the example above, the figures for the symbols and formulas in Table 1 above would read as follows in Table 2 below:

TABLE 2

X = $25
S1 = $30
S2 = $22-/12
P1 = $1
P2 = $2
F1 = 2
F2 = 0.5
D1 = $100
D2 = $200
$30 before 22½ (S1 before S2) = (F1 × D1) +
D1 = (2 × $100) + $100 = $300*

TABLE 2-continued $22½ before $30 (S2 before S1) = (F2 × D2) +
D2 = (0.5 × 200) + $200 = $300*

*Total Return is the payoff realized on the position plus the original cash position.

It will be appreciated that the total potential return for either position in a Win, Lose or Draw contract is the same for either party on a contract-for-contract basis. This can be further demonstrated in Table 3 below by using the distributive property to show the two events "S1 before S2" and "S2 before S1" are both equal to 100N(P1+P2) where "N" is the number of contracts:

TABLE 3

$$
\begin{aligned}
S1 \text{ before } S2 &= (F1 \times D1) + D1 \\
&= (P2/P1 \times P1 \times 100 \times N) + (P1 \times 100 \times N) \\
&= (P2/\cancel{P1} \times \cancel{P1} \times 100 \times N) + (P1 \times 100 \times N) \\
&= (P2 \times 100 \times N) + (P1 \times 100 \times N) \\
&= 100N (P2 + P1) \\
S2 \text{ before } S1 &= (F2 \times D2) + D2 \\
&= (P1/P2 \times P2 \times 100 \times N) + (P2 \times 100 \times N) \\
&= (P1/\cancel{P2} \times \cancel{P2} \times 100 \times N) + (P2 \times 100 \times N) \\
&= (P1 \times 100 \times N) + (P2 \times 100 \times N) \\
&= 100N (P1 + P2)
\end{aligned}
$$

In essence, either party is placing a bet that one event will occur before another event with respect to a given underlying financial instrument within a designated, finite time frame. If neither event occurs, neither party wins nor loses. Exchanges can generate revenue by either making a market for Win, Lose or Draw positions as well as by charging brokerages for the right to offer the derivative and for providing clearing house services, either as a straight-out fee or licensing right, or as a percentage of the trading transaction fees generated by brokerage houses from their retail and/or institutional clients.

Yet another way that brokerages, exchanges and clearing houses can generate revenue is to retain a small percentage of the payoff on successful contract positions as a fee. So in the above example, if the true-odds payoff for the Win, Lose or Draw Call position is 2:1, and a fee of 1% was excised, then instead of a payoff of $200, a successful party would receive $198 and the brokerage, exchange and clearing house can share the $2 proceeds.

The advantages of this premium-free derivative are manifold. As stated earlier, it eliminates the risk of a premium decreasing in value or expiring worthless. If one is confident that a stock, index or futures is going to move in a certain direction, either for purely speculative purposes or hedging purposes, but is not confident as to the extent of the movement, a Win, Lose or Draw offers insurance against coming up short of one's expectations. It also reduces the need for elaborate hedging strategies such as delta hedging because one no longer has to hedge against the prospect of losing a sizable premium due to an option's eroded time value.

Furthermore, it also provides an excellent method of hedging against a long or short position in an underlying instrument without having to write a Covered Call or Put.

Additionally, it provides a win, lose or draw situation for volatile and short-term speculative market environments with the confidence of knowing that if an anticipated move in a given direction for an underlying is correct but comes up short of expectations, one would not lose any of his cash position, aside from the broker's trade transaction fee.

Those skilled in the art will recognize that the hardware and software infrastructure required to implement a product specific to the invention can easily be adapted from technology already widely in use. Furthermore, those skilled in the art will recognize that the legal and logistical requirements of establishing, issuing, listing and trading a new type of derivative on the various exchanges are also well understood. Computer programs that instantly calculate and update Win, Lose or Draw contracts based on an underlying's spot price and its associated options strike prices and premiums would allow traders to see exactly what they would stand to gain or lose from a position in a product specific to the invention. Additionally, computer programs can record the cash positions for Win Lose or Draw contracts, hold the cash positions in an escrow account until the contract is resolved and settled either before or at expiry. Furthermore, those skilled in the art will recognize that these systems and mechanisms may or may not involve options clearing houses as well as market makers to help ensure a liquid market in the trading of products specific to the invention.

As stated earlier, the invention can be applied to any financial instrument with listed options. Additionally, special Win, Lose or Draw probability tables can be calculated and listed, either as a dedicated tool for creating a liquid market in Win, Lose or Draws or strictly for those underlying financial instruments that do not carry traditionally listed options.

It is to be understood that the embodiments shown and described herein are merely illustrative of the principles of this invention and that various modifications may be implemented by those skilled in the art without departing from the scope and spirit of the invention.

What is claimed is:

1. A computer-implemented method of executing a derivative contract between two parties, comprising:

a) receiving and processing, by means of a programmed computer, a cash position on behalf of a first party that a designated price event above an underlying financial instrument's spot price will occur before a designated price event below the underlying financial instrument's spot price within a predetermined time frame;

b) receiving and processing, by means of a programmed computer, a cash position on behalf of a second party that the designated price event below the underlying financial instrument's spot price will occur before the designated price event above the underlying financial instrument's spot price within the same predetermined time frame; and c) determining the outcome and settling the contract between the two respective parties, by means of a programmed computer, wherein:

i) the contract is settled in the first party's favor if the designated price event above the underlying financial instrument's spot price occurs before the designated price event below the underlying financial instrument's spot price within the predetermined time frame;

ii) the contract is settled in the second party's favor if the designated price event below the underlying financial instrument's spot price occurs before the designated price event above the underlying financial instrument's spot price within the predetermined time frame; and iii) the contract is settled in neither party's favor if neither designated price event occurs within the predetermined time frame.

2. The computer-implemented method according to claim 1, wherein the underlying financial instrument may be a single-stock equity, equity index, single-stock future, equity index future, commodity, commodity future, commodity index future, currency, currency index, currency future or currency index future.

3. The computer-implemented method according to claim 1, wherein the designated price events above and below the underlying financial instrument's spot price are based at least in part on option strike prices.

4. The computer-implemented method according to claim 1, wherein the designated price events above and below the underlying financial instrument's spot price are based at least in part on dedicated target price tables unrelated to preexisting option strike prices.

5. The computer-implemented method according to claim 1, wherein the designated price event above the underlying financial instrument's spot price comprises the occurrence of an exact price above the underlying financial instrument's spot price or any price above the exact price.

6. The computer-implemented method according to claim 1, wherein the designated price event below the underlying financial instrument's spot price comprises the occurrence of an exact price below the underlying financial instrument's spot price or any price below the exact price.

7. The computer-implemented method according to claim 1, wherein the designated price events occur during normal trading hours and within the predetermined time frame.

8. The computer-implemented method according to claim 1, wherein the designated price events occur as closing prices for the trading day and within the predetermined time frame.

9. The computer-implemented method according to claim 1, wherein the designated price events occur in after-hours trading and within the predetermined time frame.

10. The computer-implemented method according to claim 1, wherein the first and second cash positions are based at least in part on option strike price premiums.

11. The computer-implemented method according to claim 1, wherein the first and second cash positions are based at least in part on formulas unrelated to option strike price premiums.

12. The computer-implemented method according to claim 1, wherein a settlement in the first party's favor comprises a predetermined payoff based at least in part on the implied probability of the designated price event above the underlying financial instrument's spot price occurring before the designated price event below the underlying financial instrument's spot price within the predetermined time frame.

13. The computer-implemented method according to claim 1, wherein a settlement in the second party's favor comprises a predetermined payoff based at least in part on the implied probability of the designated price event below the underlying financial instrument's spot price occurring before the designated price event above the underlying financial instrument's spot price within the predetermined time frame.

14. The computer-implemented method according to claim 12, wherein the implied probability is based at least in part on option strike price premiums.

15. The computer-implemented method according to claim 12, wherein the implied probability is based at least in part on formulas unrelated to option strike price premiums.

16. The computer-implemented method according to claim 13, wherein the implied probability is based at least in part on option strike price premiums.

17. The computer implemented method according to claim 13, wherein the implied probability is based at least in part on formulas unrelated to option strike price premiums.

18. The computer-implemented method according to claim 1, wherein the cash positions are returned to the respective parties if neither designated price event occurs within the predetermined common time frame in accordance with step c (iii).

19. The computer-implemented method according to claim 1, wherein each party's respective cash position does not include the transaction fee associated with facilitating the contract.

* * * * *

UNITED STATES PATENT AND TRADEMARK OFFICE
CERTIFICATE OF CORRECTION

| | | |
|---|---|---|
| PATENT NO. | : 7,620,589 B2 | Page 1 of 1 |
| APPLICATION NO. | : 11/484223 | |
| DATED | : November 17, 2009 | |
| INVENTOR(S) | : Bruce David Silverman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 563 days.

Signed and Sealed this

Twenty-sixth Day of October, 2010

David J. Kappos
*Director of the United States Patent and Trademark Office*